April 22, 1952 E. G. JUDD 2,594,175
METHOD OF AND APPARATUS FOR WASHING RESIDUES
Filed April 22, 1946
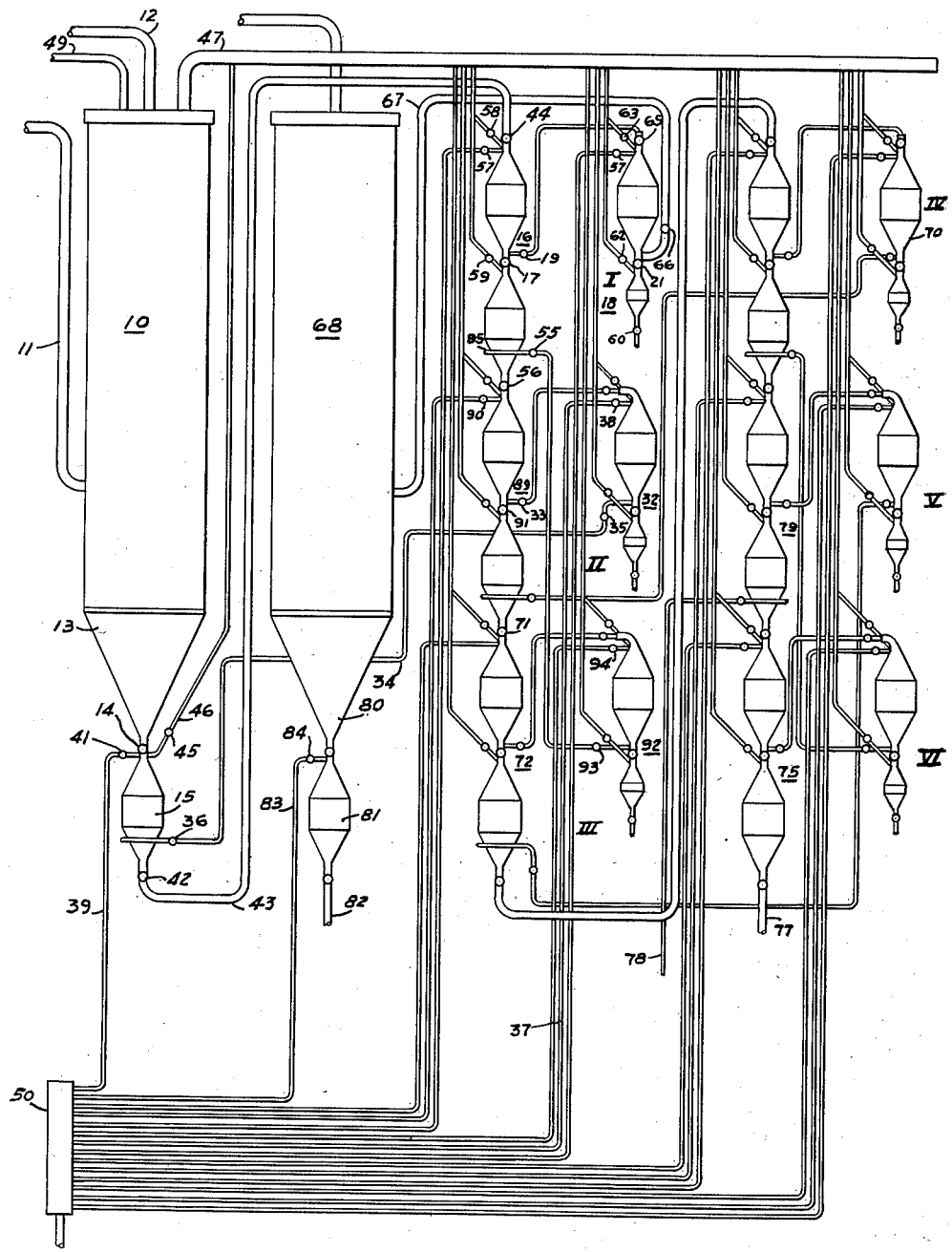
Edwin G. Judd
INVENTOR
BY
ATTORNEY Patented Apr. 22, 1952

2,594,175

UNITED STATES PATENT OFFICE 2,594,175

METHOD OF AND APPARATUS FOR WASHING RESIDUES

Edwin G. Judd, Vancouver, Wash.

Application April 22, 1946, Serial No. 663,773

10 Claims. (Cl. 134—10)

The present invention relates to improvements in washing residues or sediments. It is particularly concerned with the washing and classifying of the insoluble residues or sediments which remain after digestion or chemical treatment of ores or similar materials.

The invention has as its principal object the provision of means for separating finely divided solids from solutions containing them and for washing the solids in such a manner as to free them from the soluble components of the solution and to obtain a wash water rich in such soluble components.

Another object of the invention is to provide a process whereby the finely divided solid material being washed is at the same time classified according to particle size.

A further object of the invention is to provide apparatus for washing finely divided solid materials, the apparatus being so constructed that batches of the material being washed are passed through the apparatus in counter-current relationship with the batches of wash water.

A further object of the invention is to provide a process for washing finely divided solid materials free of soluble impurities whereby the impurities can be recovered in the form of a relatively concentrated solution.

Additional objects of the invention will become apparent from the following description thereof and by reference to the accompanying drawing illustrating one form of apparatus within the scope of the invention.

Briefly described, the process of the present invention comprises passing a predetermined quantity of the solid material to be washed through a series of washing units, contacting the material in each unit with a substantially equal volume of wash water which has been or will be employed in washing previous or subsequent batches of the solid material, allowing the solid material to settle out of the resultant mixture in each unit, and employing wash water from a succeeding unit to transfer the solid material to the next washing unit.

Additional features of the process will become apparent from a consideration of the operation of a suitable apparatus for use in the process which apparatus is illustrated in the accompanying drawing. The apparatus generally comprises a settling tank of sufficient capacity to accommodate the solution containing the insoluble finely divided solid material which is to be separated therefrom, washed, and if desired, classified. A measuring tank is connected to the bottom portion of the settling tank for the purpose of collecting a predetermined or measured quantity of solid material or residue which has separated from the solution. Conduit means are provided for introducing an equal quantity of previously used wash water into the measuring tank and for conveying the resultant mixture to a first washing unit comprising a washing tank having about twice the volume of the measuring tank. Here the solids are permitted to settle out from the batch of wash water. The washing or wash water tank, hereinafter referred to as a twin washing tank, comprises an upper and a lower half connected by means of a valve-controlled narrow intermediate portion. On settling, the solid material collects in the lower half and the supernatant liquid in the upper. Means are then provided for conveying the supernatant liquid to a wash water settling tank also comprising upper and lower parts or portions where final traces of solid material settle into the lower part leaving the clear liquid to be withdrawn from the top. The washing tank is suitably connected to a succeeding unit so that the residue in the lower half of the washing tank can be mixed with a substantially equal volume of wash water from the succeeding unit and conveyed to the next adjacent washing unit, the apparatus comprising a sufficient number of such units to thoroughly wash the residue, the residue being contacted in each unit with increasingly purer wash water.

The present invention is particularly adapted for washing the finely divided residues obtained by digesting or chemically treating an ore or mineral with concentrated hydrochloric acid for the purpose of dissolving out of the mineral certain metal components in the form of their soluble chlorides. One application of the present invention is in connection with the process of recovering iron, titanium and aluminum from minerals containing these metals in combination with silica, which process is described and claimed in my copending application, Serial No. 645,239, filed February 2, 1946, now abandoned, and which comprises digesting the finely divided mineral with concentrated hydrochloric acid at an elevated temperature. As a result of the digesting treatment there is obtained an acid solution of the chlorides of the iron, titanium, aluminum and any other metals forming soluble chlorides under the conditions of the treatment, the solution containing substantial quantities of undissolved siliceous residue. The present invention is primarily concerned with the separation of the residue from the solution and the washing of the residue in such a manner that a wash water relatively rich in acid and soluble metal chlorides is obtained.

It has been found that in the washing of the above-mentioned residue, the rate of precipitation or separation of the residue from a given batch of wash water in any unit depends on the concentration of the acid in, or the pH of, the wash water. The more acid wash water batches appear to cause a coagulation of the finely divided solids so that in the first few washing units a substantially complete settling and separation of the solids is obtained in the washing tanks. In each successive washing unit the wash water is less concentrated so that the more finely divided material is carried over into and collected in the settling tank of each unit. The finest particles are the first to be carried over from the twin washing tanks. As the batches of wash water contacted with the solids become progressively more dilute in subsequent units the residues in the lower parts of the settling tanks of each of these units will be found to differ from each other in the average particle size. Since the process is semi-continuous and approximately the same period of time is allowed for the separation of the residue in each of the washing tanks, there is thus obtained in all but the first few settling tanks, portions of the residue which are substantially classified as to particle size.

The invention will be generally described with reference to the washing of the siliceous residue obtained in the above process of ore digestion. The accompanying drawing shows a vertical representation of one embodiment of the apparatus, it being understood that the representation is to a large extent schematic and that each part need not stand in the relationship shown with reference to the remaining parts of the apparatus.

In the drawing numeral 10 indicates a relatively large settling tank having a conical or funnel shaped bottom 13, the tank being adapted to receive the mixture of finely divided siliceous residue and a relatively concentrated solution of acid and soluble metal chlorides which has been obtained for example by the acid digestion of a mineral as referred to hereinbefore. This mixture is introduced into the settling tank through intake pipe 11 entering the settling tank at a point sufficiently low in the tank to prevent disturbance of the solution in the upper part thereof. A floating outlet pipe 12 is located adjacent the top of the tank for siphoning off the clear solution and carrying it to an evaporator or other apparatus to be employed in the further processing of the solution. Immediately below the conical bottom 13 is a relatively small measuring tank 15 which preferably is conically shaped at both the top and bottom and which is connected to the apex of the bottom portion 13 of the settling tank, the connection being controlled by means of valve 14. The residue which settles to the bottom of the settling tank 10 is introduced into the measuring tank 15 by opening valve 14. When the measuring tank 15 is filled with residue, valve 14 is closed and the residue along with an equal volume of previously used and relatively concentrated wash water is transferred to washing unit number I.

Washing unit number I and the other washing units are all substantially identical in construction. Unit number I for example comprises a twin washing tank 16 having twice the volume of the measuring tank 15, the twin tank 16 comprising upper and lower halves, each half being of substantially the same size as measuring tank 15 and having conical bottom portions. The conical shaped lower end of the upper half of tank 16 is connected with the upper end of the lower half, the connection being controlled by valve 17. The upper half of tank 16 is connected to a wash water settling tank 18 by means of a conduit including valves 19 and 65. The wash water settling tank 18 comprises a larger upper part and a smaller lower part, the connection between the two being controlled by valve 21. Although the two parts differ in size, the settling tank 18 and similar parts of the other units will be referred to as twin settling tanks to distinguish them from settling tanks 10 and 68, the latter to be described hereinafter. Similarly unit number II comprises a twin wash water tank 89, the upper portion of the tank 89 being connected to a twin settling tank 32 by a conduit including valve 33.

The previously used wash water employed as the first wash for the measured batch of solid material from measuring tank 15 and which is used to transfer the batch to unit number I is supplied to the measuring tank 15 through conduit 34 from the upper portion of the twin wash water settling tank 32 of unit II. The flow of wash water through pipe 34 is controlled by means of a valve 35 adjacent the upper part of the wash water settling tank 32 and a second valve 36 adjacent the lower portion of the measuring tank 15. Air under pressure is introduced into the upper part of the twin wash water settling tank 32 from compressed air manifold 50 through pipe 37 and forces the wash water from unit II into the lower portion of measuring tank 15, valve 38 controlling the flow of compressed air through pipe 37. The wash water from unit II is preferably introduced into the measuring tank through a plurality of nozzles or jets (not shown) spaced circumferentially of the bottom portion of the measuring tank 15.

As the wash water from unit II enters the measuring tank 15 adjacent the bottom thereof, compressed air is also admitted to the upper part of the measuring tank through conduit 39, valve 41 being opened for this purpose. During this period, valves 42 and 44 in conduit 43 are open so that the mixture of wash water and residue will be forced through conduit 43 into the twin wash water tank 16 of unit I. When all of the mixture has been transferred, valves 36, 41, 42 and 44 are again closed, and valve 14 opened to admit another batch of residue into the measuring tank from settling tank 10.

To provide for the escape of air and accumulated fumes from the measuring tank 15 during the time the tank is being filled with residue from settling tank 10, a breather pipe 46 is provided connecting the upper part of the measuring tank with a breather pipe manifold 47, valve 45 in breather pipe 46 being closed except when the measuring tank is being filled with residue. Breather pipe manifold 47 is in turn connected with the top of the settling tank 10, the fumes from the breather pipe manifold and also those collecting in the upper portion of the settling tank being allowed to escape from the settling tank through pipe 49 and conveyed thereby to a suitable scrubber (not shown).

While the mixture of residue and wash water is being introduced into the twin wash water tank 16 of unit number I, valve 19 in the pipe connecting the upper part of tank 16 with the wash water settling tank 18 is closed as are also valve 57 for regulating the flow of air from manifold 50 into the upper part of the twin wash water tank, valve 55 in the pipe between the upper half of the twin settling tank of unit III and the lower half of twin washing tank 16 of unit I, valve 56 controlling the connection between the lower portion of the twin wash water tank 16 of unit I and the upper portion of twin wash water tank 89 of unit II. During this same period, valve 17 between the upper and lower portions of the tank 16, and valves 58 and 59 in the conduits leading respectively from the upper end of the upper half and the upper end of the lower half of tank 16 to the breather pipe manifold 47, are open.

The mixture is allowed to remain in twin tank 16 until all or substantially all of the residue has settled through the open valve 17 into the lower half of the twin washing tank. Valve 17 is then closed and the concentrated wash water in the upper half of the twin washing tank 16 is conveyed through the conduit controlled by valves 19 and 65 into the twin settling tank 18. To accomplish this transfer valve 57 controlling the flow of compressed air into the upper half of tank 16 is opened. During the filling of settling tank 18 valve 21 controlling the connection between the upper and lower parts of the settling tank is open while valve 60 controlling the outlet end of the lower part of tank 18 is closed. During the same period valve 62 in the breather pipe connecting the upper portion of the lower portion of tank 18 with breather pipe manifold 47 is open as is also valve 63 in the breather pipe connecting the upper part of tank 18 with the breather pipe manifold.

The residue collected in the lower half of twin washing tank 16 is removed to the twin washing tank 89 of unit II. Before the transfer, valves 19, 44, 58 and 59 in the various conduits connected to tank 16 are closed as are also valves 33, 71 and 90 on the twin washing tank 89 and valve 17 controlling the connection between the upper and lower halves of the twin washing tank of unit I, and valve 91 in twin washing tank 89 are opened. Wash water from the twin wash water settling tank 92 of unit III is introduced into the lower half of tank 16 by opening valves 55 and 93 in the conduit connecting these tanks and at the same time compressed air is admitted into tank 92 by opening valve 94. The wash water is thereby forced into the lower half of washing tank 16 of unit I through nozzles connected to header 95 and the wash water-residue mixture forced from the bottom of tank 16 through open valve 56 into twin washing tank 89 of unit II by means of compressed air introduced into tank 16 by opening valve 57. Valve 56 is then closed and other valves controlling the various conduits connected to twin washing tank 16 adjusted as hereinbefore described so that another batch of residue can be transferred to tank 16 from measuring tank 15.

Periodically the clear or substantially clear wash water in the upper part of twin settling tank 18 is transferred through pipe 67 to settling tank 68. The transfer is accomplished by opening valve 66 in pipe 67 and valve 57 in the compressed air line connected to the upper end of the twin settling tank 18 thereby forcing the wash water rich in dissolved acid and metal salts through pipe 67 into the wash water reservoir and final settling tank 68 at a point sufficiently low in the tank to avoid disturbing the clear wash water at the top.

Any solid material which may collect in the lower half of the twin wash water settling tank 18 from a plurality of batches of wash water which have passed through tank 18 can be discharged therefrom during a period when the upper part of the tank is empty. The discharge is accomplished by opening valve 60 and forcing the fines through the outlet controlled by this valve by means of compressed air introduced through the pipe controlled by valve 57, valves 62, 63, 66 and 65 being closed and valve 21 open during this step.

The number of washing units employed will depend upon the nature and amount of the impurities and the degree of purity desired for the washed product. Each washing unit corresponds to those previously described in detail and operates in a like manner. For example, the wash water employed for washing the residue collecting in the lower half of the twin wash water tank 89 of unit II comes from the twin wash water settling tank 70 of unit 4, the mixture passing through open valve 71 into the twin wash water tank 72 of unit III. Each batch of residue is repeatedly washed with batches of wash water which are progressively less concentrated with regards to impurities, the residue being stepped down through the various units by wash water stepped up from the last washing of the residue in the last twin washing tank 75 of unit VI. Finally the washed residue is discharged from the lower half of the twin washing tank 75 of unit VI through the valve controlled outlet 77, the required amount of pure or fresh wash water for operation of unit VI being taken into the system through pipe 78 connected to the bottom or residue half of the twin washing tank 79 of unit V.

As some fines may still be present in the wash water entering the wash water reservoir 68 this reservoir is preferably provided with a conical shaped bottom portion 80 having a valve controlled opening at the bottom thereof communicating with a relatively small sediment tank 81 into which any residue collecting in the bottom of the tank 68 can be periodically discharged. When tank 81 becomes filled with residue it is emptied through a valve controlled outlet 82 at the bottom thereof, the discharge of the residue being aided by compressed air introduced into the upper portion of tank 81 through compressed air line 83, valve 84 in line 83 being otherwise closed.

For proper functioning of the apparatus it is necessary that each of the twin settling tanks be filled with wash water at the beginning of operations. These tanks can be filled in the following manner. Fresh water is introduced into the system through inlet pipe 78 and by proper manipulation of the various valves caused to fill all of the twin washing tanks or at least all except the twin tank 16 of unit I. The valves are again adjusted so that the water in the twin washing tank of each unit is transferred to the twin settling tank of that unit in an amount sufficient to fill the latter after which the remaining water in the lower halves of the twin washing tanks is drained down through the various units and discharged through outlet 77. Since the first few batches of wash water transferred to final settling tank 68 will be relatively dilute, it may be desirable to discard them by allowing them to drain from tank 68 through the sediment tank 81 and outlet 82.

From the above it will be seen that there has been provided by the present invention means for repeatedly washing a finely divided solid material and if desired classifying the washed material according to particle size. Only the minimum amount of water is required for the washing operation, the method of bringing the wash water into contact with the various batches of finely divided solid material being such that there is obtained final batches of wash water which are relatively concentrated with reference to the impurities and which can therefore be treated in the same manner as the solution with which the finely divided solid material was originally in contact. The apparatus is designed to operate by gravity insofar as the separation of the solids from the liquid is concerned so that no filter presses or similar devices need be employed. A particular advantage results from the fact that the more concentrated batches of wash water employed in the first few units of the apparatus are sufficiently acid to cause a coagulation and hence a quick settling or separation of the finely divided solid material from the liquid. It will be obvious, of course, that various means may be provided for performing all of the valve opening and closing operations automatically, and that in some cases as for instance in the lines for conveying the wash water from the twin washing tanks to the twin wash water settling tanks of each unit, one valve may take the place of the two illustrated in the accompanying drawing.

Having described the invention in what are considered to be certain preferred embodiments thereof, it is desired that it be understood that the specific details shown and described herein are merely illustrative and that this invention may be carried out by other means.

What I claim is:

1. The process of washing a finely divided solid material which comprises measuring a quantity of said material, passing said measured quantity of said solid material through a plurality of washing units interconnected as a closed system, contacting said material in each unit with a measured quantity of wash water which has previously been employed in washing a preceding measured quantity of solid material in a succeeding unit, and employing compressed air to transfer by extrusion the solid material and wash water from one unit to another.

2. The process of washing a finely divided solid material which comprises passing a measured quantity of said solid material and wash water through a plurality of washing units interconnected as a closed system allowing the solid material to settle from the wash water in said washing units, removing the wash water from above the settled solid material in each of said washing units, and employing other wash water which has previously been used to wash a preceding quantity of solid material in a succeeding unit to render the finely divided solid material substantially fluid, and employing compressed air to transfer by extrusion the solid material and wash water from one unit to another.

3. In the process of washing and classifying a finely divided solid material containing dissolved or soluble impurities which process includes passing measured batches of said solid material through a series of washing units and contacting said material in each unit with wash water from a succeeding unit; the steps which comprise collecting predetermined measured batches of said finely divided solid material, mixing each of said batches with wash water which has been employed in washing a previous batch of solid material, conveying said mixture to a first washing unit, allowing the solid material to settle out of the wash water in said first unit, employing used wash water supplied directly from a third washing unit to convey said solid material to a second washing unit, said wash water from said third unit by-passing said second unit in passing to said first unit, continuing the process of mixing the batches of solid material with succeeding quantities of progressively less concentrated wash water and transferring the mixtures to a succeeding washing unit, and permitting the suspended material in each quantity of wash water from each unit to settle out prior to use of said water in washing another batch of solid material whereby the finer portions of the solid material are classified according to particle size.

4. An apparatus of the class described comprising a series of interconnected washing units each of said units comprising a washing tank and a wash water settling tank, means connecting the bottom of the washing tank of each unit with the top of the washing tank of the next succeeding unit, conduit means connecting the washing tank of each unit intermediate its upper and lower ends with the wash water settling tank of the same unit, and fluid conduit means connecting the lower end portion of the washing tank of each unit with the settling tank of a unit once removed therefrom for supplying wash water from said settling tank to said washing tank.

5. An apparatus of the class described comprising a series of interconnected washing units each of said units comprising a washing tank and a wash water settling tank, each washing tank including an upper and a lower portion and valve means for separating said portions, means connecting the bottom of the lower portion of the washing tank of each unit with the top of the upper portion of the washing tank of the next succeeding unit, fluid conduit means connecting the bottom of the upper portion of the washing tank of each unit with the settling tank of the same unit, and fluid conduit means connecting the lower portion of the washing tank of each unit with the wash water settling tank of a unit once removed therefrom.

6. An apparatus of the class described for use in washing finely divided solid materials and comprising a plurality of washing units, each of said units including a washing tank and a wash water settling tank, each of said washing tanks being composed of an upper and a lower half having a conduit connection therebetween, the connection between said halves being provided with a valve for controlling the connection therebetween, means for introducing a mixture of finely divided solid material and wash water into the washing tank of a first unit, a conduit connecting the upper half of the washing tank of the first unit with the settling tank of said first unit for conveying the liquid separated from the finely divided solid material in said mixture into the settling tank of said first unit, a conduit connecting the settling tank of a third unit with the lower half of the washing tank of said first unit for supplying a batch of wash water from the settling tank of a third unit to the solid material in said first unit, and conduit means for conveying solid material and wash water from said first unit into the washing tank of a second unit.

7. An apparatus of the class described for use in washing finely divided solid materials and comprising a plurality of washing units interconnected as a closed system each of said units including a washing tank and a wash water-settling tank each of said washing tanks being composed of an upper and a lower half, the connection between said halves being provided with a valve control, means for introducing a mixture of finely divided solid material and wash water into the washing tank of a first unit, a conduit communicating between the upper half of the washing tank of said first unit and the settling tank of said first unit for conveying the liquid separated from the finely divided solid material in said mixture into the settling tank of said first unit, a conduit communicating between the settling tank of a third unit and the lower half of the washing tank of the first unit for supplying water to the finely divided solid material in said first unit, a conduit connecting the bottom half of the washing tank of said first unit with the washing tank of a second unit, and means for introducing compressed air into the washing tank of said first unit to force the mixture of solid material and wash water into the washing tank of said second unit.

8. Apparatus of the class described comprising a main settling tank adapted to receive a mixture of a finely divided solid material and a solution of soluble salts, a measuring tank connected to the lower end of said settling tank for receiving the finely divided material settling out of said mixture, a series of washing units, each of said units including a washing tank and a water settling tank, the washing tank of each unit comprising an upper half and a lower half having an opening therebetween and means for closing the opening between said halves, means for introducing a quantity of used wash water into said measuring tank, a conduit extending from said measuring tank to the washing tank of a first unit for conveying the mixture of used wash water and finely divided solid material to the washing tank of a first washing unit, a conduit extending from the upper half of the washing tank of said first unit for conveying the wash water separated from said mixture to the settling tank of said first unit, a conduit interconnecting the washing tanks of said first and second units for conveying the finely divided solid material from said first unit to the washing tank of a second unit, a water supply conduit connecting the settling tank of a third unit with the lower half of the washing tank of the first unit whereby wash water from the settling tank of the third unit aids in conveying said finely divided solid material to the washing tank of the second unit.

9. Apparatus of the class described comprising a main settling tank adapted to receive a mixture of a finely divided solid material and a solution of soluble salts, a measuring tank including a valved inlet connecting with the lower end of said settling tank for receiving the finely divided material settling out of said mixture, a series of washing units interconnected as a closed system, each of said units including a washing tank and a water settling tank, the washing tank of each unit comprising connecting upper and lower halves and means for closing the opening between said halves, conduit means communicating with said measuring tank for introducing a quantity of used wash water into said measuring tank, conduit means connecting said measuring tank and the washing tank of a first washing unit for conveying the mixture of used wash water and finely divided solid material from said measuring tank to the washing tank of said first washing unit, a conduit connecting said last mentioned washing tank and the settling tank of said first unit for conveying the wash water separated from said mixture to the settling tank of said first unit, a conduit connecting said last mentioned washing tank to the washing tank of a second unit for conveying the finely divided solid material from said first unit to the washing tank of a second unit, a wash water supply conduit connecting the settling tank of a third unit with the washing tank of the first unit whereby wash water from the settling tank of the third unit aids in conveying said finely divided solid material to the washing tank of the second unit, and means for supplying air under pressure to the upper half of each washing tank and to each wash water settling tank to aid in the discharge of the contents thereof.

10. A washing apparatus of the class described for use in washing finely divided solid materials, the said apparatus including a plurality of washing units connected together as a closed system in a series relation, means for passing a measured batch mixture of finely divided solid material and wash water into a first of said units, means for withdrawing wash water separated from said solid material from said first washing unit, means for subsequently introducing additional wash water into said first washing unit less concentrated than the wash water previously removed from said washing unit, said additional quantity of wash water aiding in transferring said solid material from said first washing unit into the next successive washing unit, means for supplying compressed air to the upper portion of said first washing unit for assisting the transfer of solid material and wash water from said first washing unit to the next successive washing unit.

EDWIN G. JUDD.

REFERENCES CITED

The following references are of record in the file of this patent:

UNITED STATES PATENTS

| Number | Name | Date |
|---|---|---|
| 406,781 | Singer | July 9, 1889 |
| 1,683,262 | Richter | Sept. 4, 1928 |
| 2,156,364 | Urschel | May 2, 1939 |
| 2,205,657 | King | June 25, 1940 |
| 2,244,035 | Whitmore | June 3, 1941 |
| 2,321,885 | Allen | June 15, 1943 |